(12) United States Patent
Burer

(10) Patent No.: US 7,413,158 B1
(45) Date of Patent: Aug. 19, 2008

(54) SHOCK ABSORBING PLATFORM WITH DAMPENING MEANS

(76) Inventor: Peter J. Burer, 10023 87th St. North, Largo, FL (US) 33777

( * ) Notice: Subject to any disclaimer, the term of this patent is extended or adjusted under 35 U.S.C. 154(b) by 140 days.

(21) Appl. No.: 10/904,395

(22) Filed: Nov. 8, 2004

(51) Int. Cl.
*F16M 1/00* (2006.01)
(52) U.S. Cl. .................. 248/564; 248/421
(58) Field of Classification Search .......... 248/421, 248/424, 419, 564, 565, 566, 584, 585, 588; 267/131, 133, 142, 143, 182; 108/145, 136; 297/344.15, 329, 340
See application file for complete search history.

(56) References Cited

U.S. PATENT DOCUMENTS

| | | | | |
|---|---|---|---|---|
| 4,093,197 A | * | 6/1978 | Carter et al. | 267/131 |
| 5,580,027 A | * | 12/1996 | Brodersen | 248/564 |
| 5,794,911 A | * | 8/1998 | Hill | 248/588 |
| 5,927,679 A | * | 7/1999 | Hill | 248/588 |
| 5,950,977 A | * | 9/1999 | Proksch et al. | 248/421 |
| 5,957,426 A | * | 9/1999 | Brodersen | 248/588 |
| 5,984,410 A | * | 11/1999 | Brodersen | 297/339 |
| 6,135,412 A | * | 10/2000 | Buehler | 248/421 |
| 6,199,820 B1 | * | 3/2001 | Ritchie | 248/550 |
| 6,202,972 B1 | * | 3/2001 | Manavi | 248/421 |
| 6,550,740 B1 | | 4/2003 | Burer | |
| 6,776,384 B2 | * | 8/2004 | Igarashi | 248/421 |
| 2004/0144906 A1 | * | 7/2004 | Hill et al. | 248/421 |
| 2005/0001133 A1 | * | 1/2005 | Bostrom et al. | 248/419 |

\* cited by examiner

*Primary Examiner*—A. Joseph Wujciak, III
(74) *Attorney, Agent, or Firm*—Ronald E. Smith; Smith & Hopen, P.A.

(57) ABSTRACT

A shock-absorbing platform includes a bottom plate and a top plate joined to one another along at least two sides by elongate rigid links that enable the plates to remain in parallel relation to one another as the plates are displaced responsive to externally-imparted forces. An air spring resists relative vertical motion between the bottom and top plates as external forces are applied to the platform. A shock-absorbing damper damps the natural oscillation of the air spring. The resistance presented by the air spring is adjustable through an inlet and outlet port in fluid communication with a remote source of air under pressure. In a second embodiment, a seat bottom includes arched leaf springs that supplant the air spring to increase the range of relative movement between the top and bottom plates and to lower the profile of the seat bottom.

2 Claims, 8 Drawing Sheets

SHOCK ABSORBING PLATFORM WITH DAMPENING MEANS

BACKGROUND OF THE INVENTION

1. Field of the Invention

This invention relates, generally, to a shock absorbing platform construction upon which a user may sit or stand or onto which may be mounted a seat or other item. It further relates to a seat bottom construction. The platform and seat bottom are adapted for use in vehicles subjected to violent shocks such as speedboats, off-road vehicles, and the like.

2. Description of the Prior Art

Many speedboats, off-road vehicles, and other vehicles are equipped with seats or platforms that provide inadequate protection against shocks of the type encountered by such vehicles. Moreover, many of the known shock-absorbing seats or platforms are structurally complex mechanisms requiring specially manufactured, expensive parts.

What is needed, then, is a shock absorbing seat or platform having improved shock absorbing attributes. The needed seat or platform should be made of inexpensive, relatively few, and commonly available parts.

The known shock-absorbing seats or platforms also lack adjustment means for accommodating users of varying weights. Therefore, they also lack adjustment means to compensate for differing vehicle speeds and the sea state for marine applications or the roughness of the terrain for land applications.

Thus there is a need for an adjustable shock-absorbing seat or platform to compensate for a user's weight, for differing vehicle speeds, sea states, and the like.

Speedboats are often equipped with a pedestal-mounted bolster chair having a heavily padded back and sides and a seat that may be folded out of the way when a user desires to stand. The user folds the horizontal seat when it is unable to adequately attenuate shocks generated by the violent jolting of the vehicle and stands in a space bounded by the back and sides. However, the standing user must then rely on his or her legs to absorb the shocks as they come.

There exists a need, therefore, for a shock-absorbing platform upon which a user may stand when a vehicle is undergoing intense vibrations and shocks.

Moreover, there is a need for such a platform that fits within the space bordered by the back and sides of a bolster chair so that a standing user could be protected at the back and sides by the bolster chair while standing on a shock absorbing platform.

Some boats, such as bass boats, lack shock-absorbing seats. There is a need, then, for a shock absorbing seat that can be placed in such a boat. More particularly, the marine and off-road vehicle industries have a need for a shock absorbing seat bottom which absorbs impact forces directed to the human body when traveling over rough seas or unimproved roads.

The needed shock absorbing seat bottom requires more than a shock-mitigating bias means. Controlled damping of the shock waves is also required, both when the seat bottom is compressed and when the seat bottom rebounds after such compression.

Many of the known seat bottoms are undamped and therefore are subject to unacceptable oscillations. In a boat traveling at high speeds, this can lead to ejection of the occupant and hence to severe or fatal injuries.

Some of the known seat bottoms incorporate a damper to suppress such oscillations, but the construction of such seat bottoms is complex. Perhaps even more importantly, such seat bottoms have a limited range of motion when resisting a shock. For example, a seat bottom having a top wall and a bottom wall will undergo compression when a shock is imparted thereto, i.e., the top and bottom walls will converge toward one another. Such compression is followed by a rebound where such top and bottom walls diverge from one another when the shock dissipates and the bias means acts to return said top and bottom walls to their respective equilibrium positions. In the known seat bottoms having both a bias means for shock absorption and a damping means to damp the natural oscillation of the bias means, the construction is such that top and bottom walls of the seat bottom may not converge closely toward one another during the shock. Thus, the amount of shock that the seat bottom may absorb is limited.

Accordingly, a need is extant for a seat bottom construction having a bias means, a damping means, and a construction with a low profile so that the top and bottom walls of the seat bottom may converge toward one another to a substantially greater degree than possible with prior art seat bottom constructions.

A taller seat could have a greater travel, but at the expense of proper ergonomics.

The shock absorbing attributes of the platforms of the prior art are difficult to adjust. For example, the shock absorbing platform disclosed in U.S. Pat. No. 3,086,742 to Severson requires disassembly and re-assembly of the apparatus to replace a first set of spacer members with a second set of spacer members when a primary adjustment means is inadequate.

U.S. Pat. No. 6,550,740, to the present inventor discloses a shock absorbing platform having multiple dampers that perform a shock absorbing function. However, although the platform provides easy access to adjustment knobs when mounted in a pedestal, it provides no adjustment means as a stand-alone device.

There is a need, then, for a shock absorbing platform that is adjustable to accommodate a user's weight so that it restores full extension quickly, thereby readying the platform to absorb the next impact.

However, in view of the prior art considered as a whole at the time the present invention was made, it was not obvious to those of ordinary skill in the pertinent art how the identified needs could be fulfilled.

SUMMARY OF THE INVENTION

The long-standing but heretofore unfulfilled need for an adjustable shock absorbing platform that provides easy access to adjustment means, which may be used without a pedestal as a platform upon which to stand or sit, and which quickly recovers to an equilibrium position of repose after absorbing a shock, is now met by a new, useful, and nonobvious invention.

Moreover, the long-standing but heretofore unfulfilled need for a seat bottom construction having a bias means and a damping means that enable the seat bottom to undergo a high degree of compression during shock administration yet which efficiently returns the seat bottom to a position of repose is also met by such new, useful and nonobvious invention.

The novel platform includes a substantially flat bottom plate of predetermined geometrical configuration and a substantially flat top plate, also of predetermined geometrical configuration, disposed in vertically spaced apart, parallel relation to the substantially flat bottom plate. In a preferred embodiment, the preferred geometrical configuration is square. However, a rectangular platform is also well within the scope of this invention, as are top plates and bottom plates of many differing sizes, shapes, and materials.

At least two pairs of elongate rigid links are positioned on at least two sides of the top plate and the bottom plate in interconnecting relation thereto. Each elongate rigid link of each pair of elongate rigid links is interconnected to its counterpart in a scissors-like interconnection so that the top plate and bottom plate remain in parallel relation to one another when the respective positions of the top and bottom plate are displaced relative to one another by the effects of an abruptly applied shock.

The pairs of elongate rigid links may be positioned along any two sides of the bottom and top plates. For example, in a first embodiment a first pair of elongate rigid links may be positioned on a first side of the platform and a second pair of elongate rigid links may be positioned on a second, opposite side of the platform so that the two pairs of elongate rigid links are in parallel relation to one another. In a second embodiment, the first pair of elongate rigid links may be positioned on the trailing side of the platform and a second pair of elongate rigid links may be positioned on said second side of the platform as in the first embodiment so that the first and second pairs of elongate rigid links are disposed at a ninety degree angle relative to one another. In additional embodiments, a third and a fourth pair of elongate rigid links may be employed, although it is believed that two pairs of said elongate rigid links, disposed in any parallel or perpendicular orientation to one another, are sufficient to maintain the bottom and top plates in parallel relation to one another.

A shock absorbing bias means in the form of an air spring is positioned in sandwiched relation between the top and bottom plates. Although depicted in the center thereof, such central positioning is not critical but it is preferred. The bottom plate of the platform supports the air spring housing and the top of the air spring housing is secured to the underside of the top plate of the platform. The air spring therefore provides a bias means that resists movement of the top and bottom platforms relative to one another. More importantly, the air spring recovers quickly after it has been fully compressed. Accordingly, it returns to its position of repose quickly after absorbing an externally-imparted force.

The amount of resistance offered by the air spring is adjustable. More particularly, air from a remote source of air under pressure may be added to the air spring through an air inlet/outlet port to increase its resistance and air may be released from said air spring at said inlet/outlet port to decrease its resistance. Significantly, the air inlet/outlet port is positioned at the front of the novel platform so that it is easily accessible and no part of the novel assembly blocks access to said port. If the platform is positioned in a recess that blocks frontal access, then the air inlet/outlet port is routed vertically to provide access from the top.

In a preferred embodiment, a damper is disposed between the top plate and the bottom plate at a preselected location offset from the centrally-mounted air spring. However, in additional embodiments, a second damper may be positioned on an opposite side of the platform but it is believed that a single damper can provide the required damping effect.

The damper may be mounted in six basic ways.

In a first way, a first end of the damper is pivotally mounted to a bracket assembly mounted on the bottom plate at the rear or trailing end of the platform and a second end of the damper is mounted to the vertex of a "V"-shaped linkage where the vertex is equidistant between the top and bottom plates at the forward or leading end of the platform.

In a second way, the first end of the damper is pivotally mounted to a bracket assembly mounted on the top plate at the rear or trailing end of the platform and the second end of the damper is mounted to the vertex of the "V"-shaped linkage where the vertex is equidistant between the top and bottom plates at the forward or leading end of the platform.

In a third way, the first end of the damper is mounted to the vertex of the "V"-shaped linkage where the vertex is equidistant between the top and bottom plates at the rear or trailing end of the platform and the second end of the damper is pivotally mounted to a bracket assembly mounted on the bottom plate at the forward or leading end of the platform.

In a fourth way, the first end of the damper is mounted to the vertex of the "V"-shaped linkage where the vertex is equidistant between the top and bottom plates at the rear or trailing end of the platform and the second end of the damper is pivotally mounted to a bracket assembly mounted on the top plate at the forward or leading end of the platform.

In a fifth way, the first end of the damper is engaged to the vertex of the "V"-shaped linkage at the trailing end of the platform and the second end of the damper is engaged to the vertex of the "V"-shaped linkage at the leading end of the platform.

In a sixth way, the second end of the damper is engaged to the vertex of the "V"-shaped linkage at the trailing end of the platform and the first end of the damper is engaged to the vertex of the "V"-shaped linkage at the leading end of the platform.

The air spring resists external forces abruptly applied to the top and bottom plates that cause the distance between the top and bottom plates to change from their equilibrium distance and performs the further function of returning the top and bottom plates to their respective initial positions of repose.

The damping means also resists said external forces and performs the further function of damping the natural oscillation of the air spring. Without the damping means, the natural oscillation of the air spring is undamped. Without the air spring, the damping means cannot restore the top and bottom plates to their respective positions of repose.

In a second embodiment of the invention, a seat bottom construction eliminates the air spring of the first embodiment so that the top plate and bottom plate may be spaced closer to one another when a shock is applied to the platform. If the plates can come closer together, a greater amount of shock is absorbed.

In the second embodiment, the bias means includes at least one spring having a shape something like a conventional leaf spring but with an arch formed mid-length thereof. In a first variation of the second embodiment, the at least one arched leaf spring has opposite ends secured to the top plate and the at least one arched leaf spring is connected at its mid-point to the bottom plate.

Alternatively, the at least one arched leaf spring has opposite ends secured to the bottom plate and the at least one arched leaf spring is connected at its mid-point to said top plate.

Any number of such arched leaf springs may be employed.

In another variation of the second embodiment, the bias means includes at least one set of opposed arched leaf springs. A first arched leaf spring of the set of opposed arched leaf springs has a mid-point secured to the bottom plate and a second arched leaf spring of the set of opposed leaf springs has a mid-point secured to the top plate. The first and second arched leaf springs have respective opposite ends secured to one another.

In still another variation of the second embodiment, the bias means includes at least one set of opposed arched leaf springs where a first arched leaf spring of said set of opposed arched leaf springs has opposite ends secured to the bottom plate and a second arched leaf spring of said set of opposed arched leaf springs has opposite ends secured to the top plate. The first arched leaf spring has a mid-point secured to a mid-point of the second arched spring.

The damper means of the first embodiment is employed in the second embodiment to damp the oscillations of the arched leaf spring or springs.

The second embodiment also employs a simpler set of brackets than the "U"-shaped brackets of the first embodiment. The brackets of the second embodiment are essentially flat. Each flat bracket is apertured to receive an axle upon which is secured an apertured end of a truncate link, the apertured end of an elongate link, or the collar of a damper. The axle and hence the link or collar is retained by a suitable cotter pin, a "C"-clip, or the like.

An important advantage of the first embodiment of this invention is that it provides a platform that has an adjustable air spring shock absorber and an adjustable shock absorber damper that has an infinite number of self-adjusting damping rates due to internal valving provided by a damper piston that is slideably mounted in the damper main body.

Another advantageous feature is that the novel platform is made of a small number of readily available, inexpensive parts.

Still another advantage is the provision of a platform that may be directly supported by a boat deck or other vehicle surface, in the absence of pedestals, so that it may be stood upon.

A closely related advantage is the provision of a platform that is sized to fit within the confines of a bolster chair so that a user can simultaneously gain the benefits of a bolster chair and the shock absorbing platform when the seat part of the bolster chair is folded into a storage position.

Still another advantage is the provision of a platform upon which a user can sit upon in a boat or other vehicle lacking a shock absorbing seat.

Additional advantages are derived from the ability of the structure to have as few as only two scissors-like elongate links, only one damper and only one air spring.

Yet another advantage is the seat bottom construction disclosed herein that has a unique structure that enables it to undergo a larger range of compression when absorbing a shock as compared to earlier seat bottom constructions, without resorting to the addition of height to the seat because such addition would make the seat ergonomically unacceptable.

These and other important objects, advantages, and features of the invention will become clear as this description proceeds.

The invention accordingly comprises the features of construction, combination of elements, and arrangement of parts that will be exemplified in the description set forth hereinafter and the scope of the invention will be indicated in the claims.

BRIEF DESCRIPTION OF THE DRAWINGS

For a fuller understanding of the nature and objects of the invention, reference should be made to the following detailed description, taken in connection with the accompanying drawings, in which.

DETAILED DESCRIPTION OF THE PREFERRED EMBODIMENT

Figure 1:
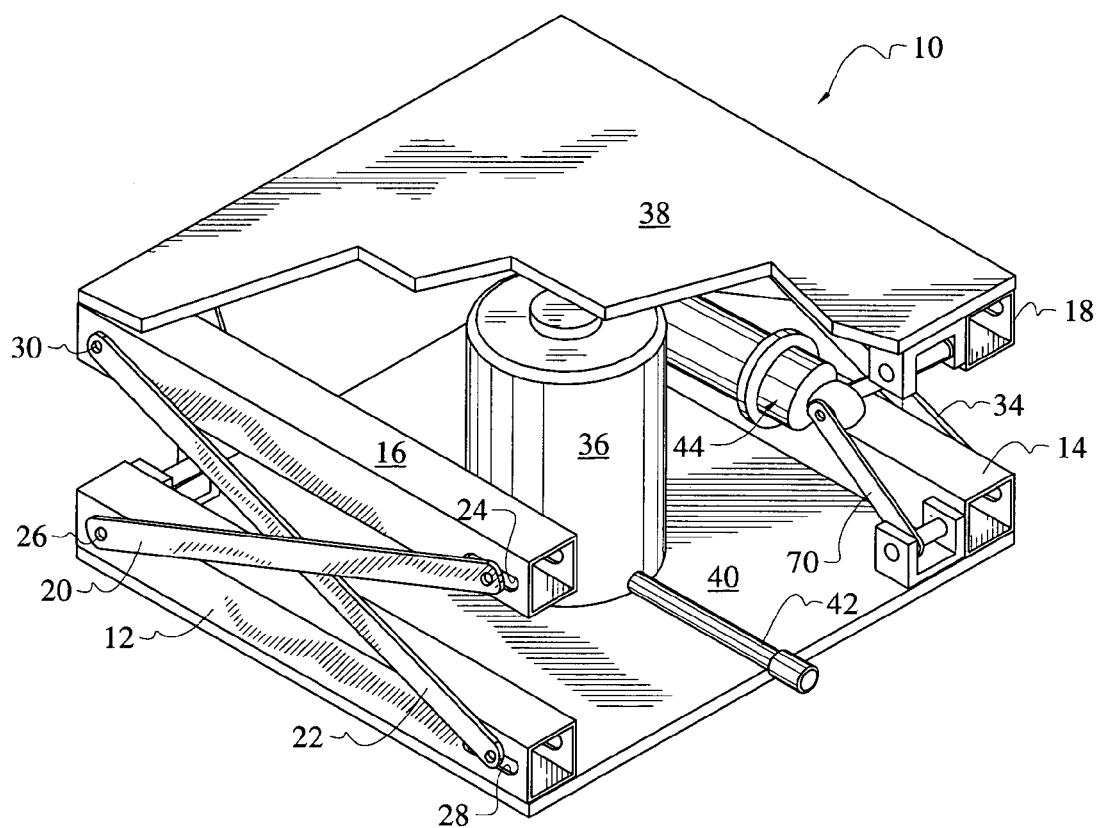
FIG. 1 is a perspective view of a first embodiment of the invention in the form of a novel shock absorbing platform.

Referring to FIG. 1, it will there be seen that the reference numeral 10 denotes an illustrative embodiment of the novel shock-absorbing platform as a whole.

In the embodiment of FIG. 1, platform 10 includes four (4) hollow girders or beams with a square or rectangular cross section, hereinafter referred to as box beams. In the front perspective view of FIG. 1, the box beams are identified as left lower box beam 12, right lower box beam 14, left upper box beam 16, and right upper box beam 18.

Figure 6:
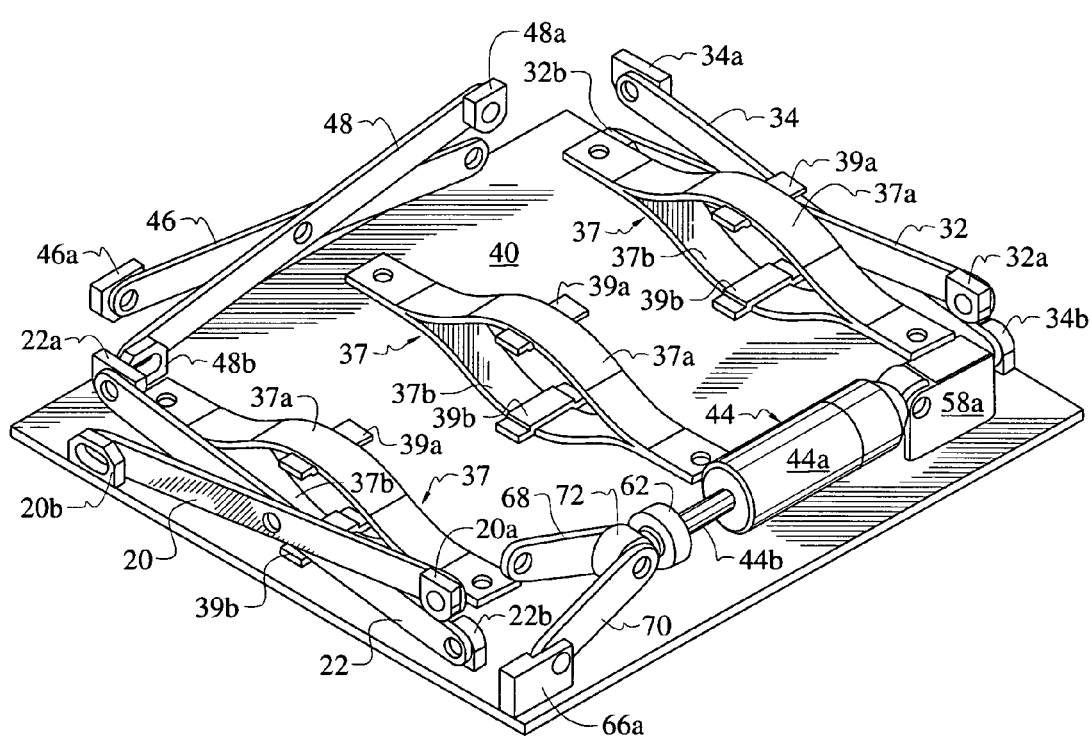
FIG. 6 is a perspective view of a second embodiment of the invention in the form of a novel shock absorbing seat bottom.
Figure 7:
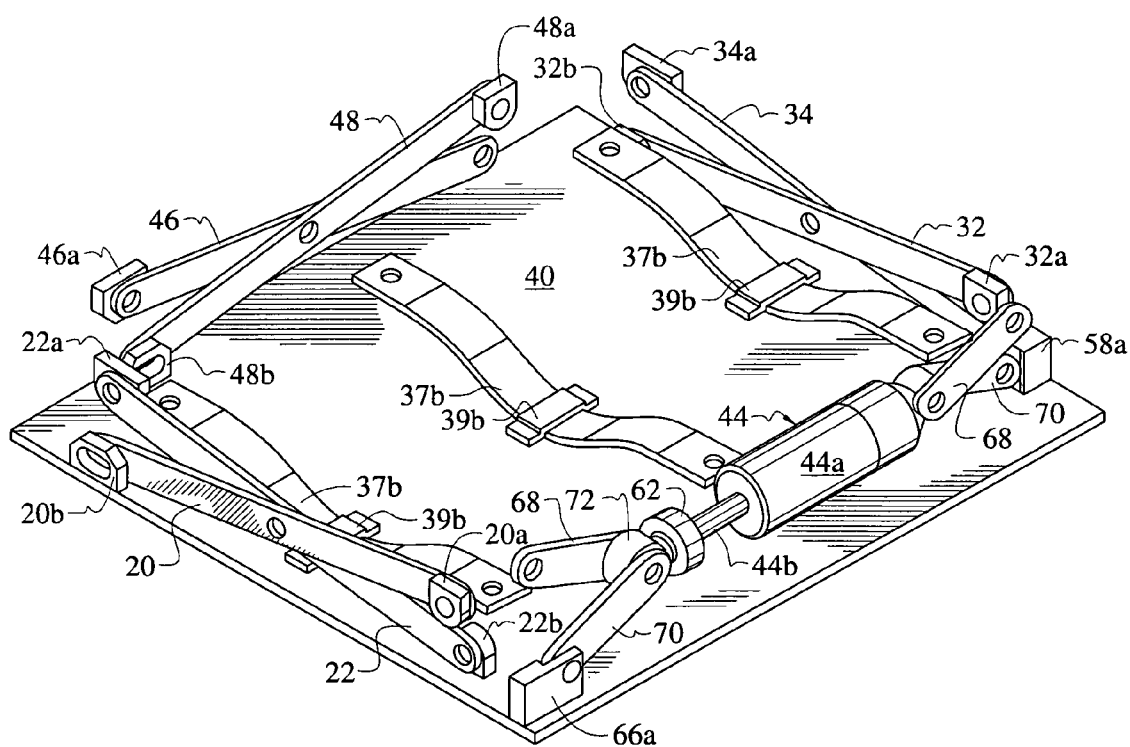
FIG. 7 is a perspective view of a first variation of said second embodiment.
Figure 8:
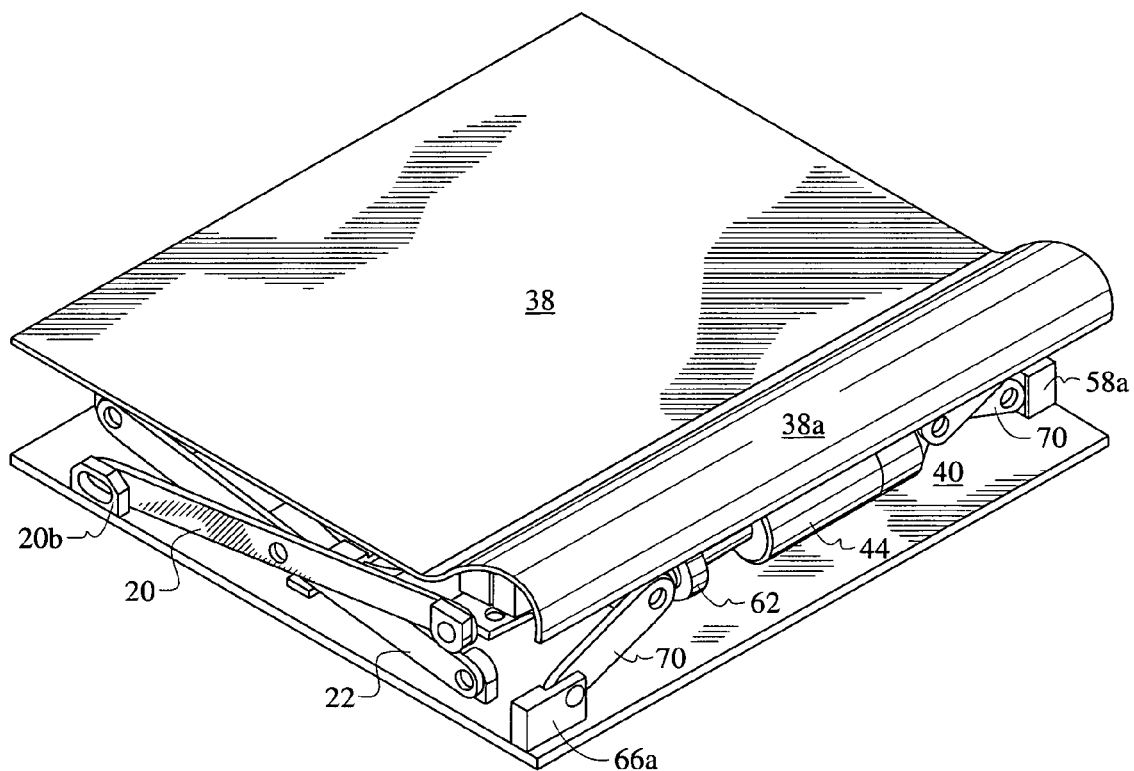
FIG. 8 is a perspective view of a second variation of said second embodiment.

Each box beam may be replaced with a flat beam of the type depicted in FIGS. 6-8.

Box beams 12 and 16 are parallel to one another, positioned in a common vertical plane, and are interconnected to one another by elongate rigid links 20, 22. The forward end of elongate rigid link 20 is connected to box beam 16 by a suitable bushing or bearing that is slideably received within slot 24 and the rearward end of elongate rigid link 20 is pivotally connected to box beam 12 at pivot point 26. The forward end of elongate rigid link 22 is connected to box beam 12 by a suitable bushing or bearing that is slideably received within slot 28 and the rearward end of elongate rigid link 22 is pivotally connected to box beam 16 at pivot point 30.

Box beams 14 and 18 are parallel to one another, positioned in a common vertical plane, and are interconnected to one another by elongate rigid links 32, 34, only the latter of which is depicted in FIG. 1. Elongate rigid links 32, 34 interconnect box beams 14, 18 in the same way that elongate rigid links 20, 22 interconnect box beams 12, 16.

The scissors-like linkages on the opposite sides of novel platform 10 thus maintain upper box beams 16, 18 in parallel relation to lower box beams 12, 14 throughout an entire range of motion by said upper box beams relative to said lower box beams. The mounting of said scissors-like links on said opposite sides provides an open center area for platform 10.

Flat top plate 38 overlies upper box beams 16, 18 and is secured thereto by any suitable means; it is cut away in the Figures just to better reveal the parts otherwise hidden by said flat top plate. A seat cushion or other suitable seating fixture, not shown, may overlie flat top plate 38 and be secured thereto by suitable means. Alternatively, a user may stand on said flat top plate with no seat cushion.

Flat bottom plate 40 underlies lower box beams 12, 14 and is secured thereto by any suitable means.

Air spring 36 is a bias means and is preferably but not necessarily mounted in the open center area of platform 10. More particularly, air spring 36 is secured in sandwiched relation between bottom plate 40 and top plate 38. Accordingly, air spring 36 acts to maintain a preselected vertical spacing between said bottom and top plates, resisting relative motion between them as externally forces are abruptly applied to platform 10.

Air passageway 42 is an inlet/outlet port that provides fluid communication between the interior of air spring 36 and a remote source of air under pressure, not shown. Introducing air into port 42 increases the resistance of air spring 36 and exhausting air therefrom decreases said resistance.

Although air spring 36 is the preferred type of bias means, it should be understood that numerous other well-known bias means such as coil springs, leaf springs, carbon fiber springs, and the like, could be employed. An air spring is preferred because its resistance is easily adjusted as just mentioned.

Significantly, air passageway 42 is accessible from the front of platform 10, there being no obstructions to such access. This important feature is provided by placing the elongate rigid links and dampers on or near the outer periphery of platform 10. As clearly depicted in all of the Figs., a user has ample access to inlet/outlet port 42, there being no parts of the novel platform positioned in blocking relation to the free end of said port. In this way, the important advantage of providing a shock absorbing platform that facilitates adjustment of the shock-absorbing aspects of the platform are met in an elegant, structurally sound manner.

Damper 44 provides a damping means for the natural vibration of air spring 36 as aforesaid. Without damper 44, air spring 36 is undamped and will oscillate, repeatedly overshoot its equilibrium position. However, with air spring 36, damper 44 lacks the resiliency required to return the bottom and top plates to their respective positions of repose.

Damper 44 interconnects the bottom and top plate to one another and in a first embodiment is mounted at an angle relative to a horizontal plane when said top and bottom plates are in a horizontal plane. Damper 44 has a housing and a plunger telescopically received within the housing. The first, housing end of the damper or the second, plunger end thereof may be pivotally mounted in closely spaced relation to the bottom or top plate of platform 10 at the trailing or leading end thereof.

Accordingly, there are four variations of this embodiment where a damper first end is pivotally mounted near said bottom (first embodiment) or top plate (second embodiment) at either the leading (third embodiment) or trailing end (fourth embodiment) of the platform, the second end engages the vertex of a "V"-shaped linkage mounted to the opposite end of the platform. In a fifth variation, as mentioned earlier, both ends of the damper are disposed in abutting relation to the vertex of a "V"-shaped linkage that interconnects the top and bottom plates at the leading and trailing ends of the platform and in a sixth variation the damper is reversed relative to its fifth embodiment position.

In the example of FIG. 1, housing 44a, not depicted in FIG. 1, of damper 44 engages the vertex of a "V"-shaped linkage mounted to the front or leading end of platform 10 at a first side thereof and plunger 44b, not shown, is pivotally mounted near bottom plate 40. This particular mounting arrangement corresponds to the aforesaid first embodiment.

Figure 2:
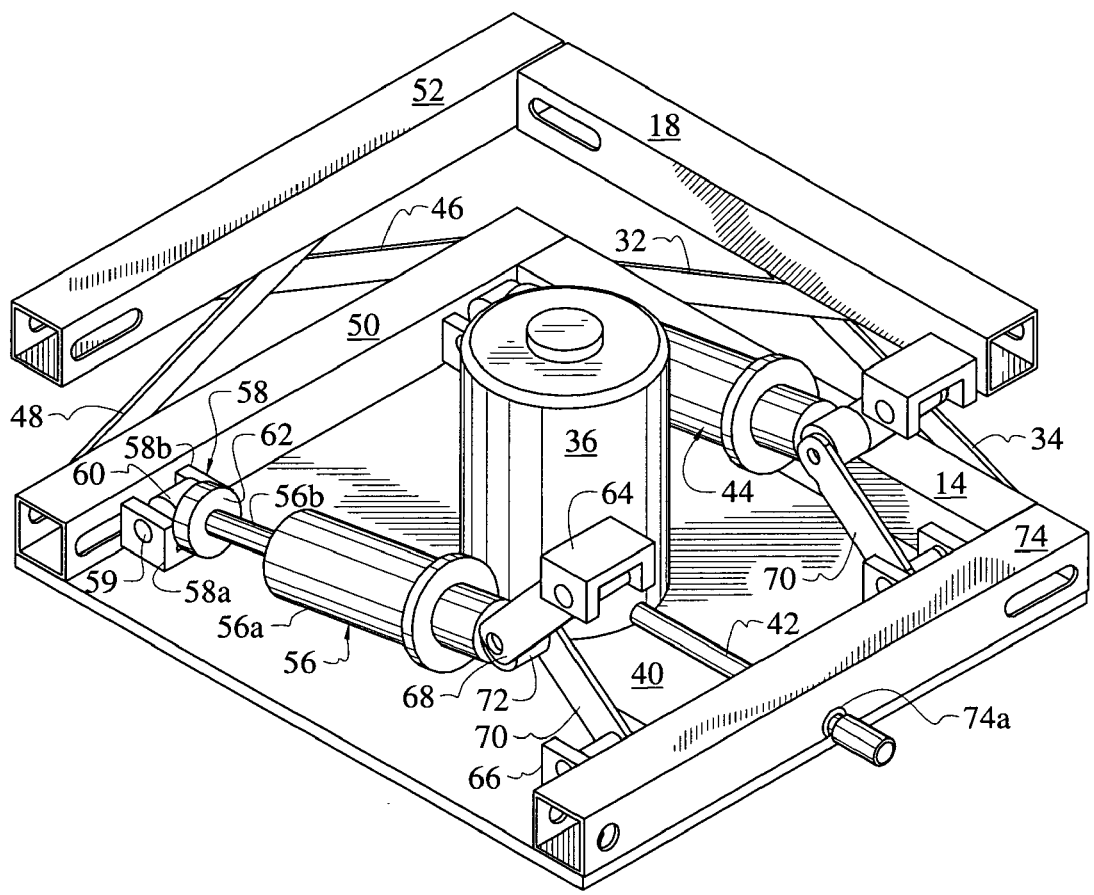
FIG. 2 is a perspective view of a second variation thereof.

A more complete understanding of the novel structure requires reference to FIG. 2. In FIG. 2, elongate rigid links 46, 48 are positioned in perpendicular relation to elongate rigid links 32, 34 instead of the parallel relation depicted in FIG. 1. It is believed that such perpendicular relation will perform as well as the parallel arrangement of elongate rigid links as disclosed in said FIG. 1.

Said elongate rigid links interconnect box beams 50, 52 mounted to the trailing end of bottom plate 40 in transverse relation thereto, i.e., in perpendicular relation to box beams 14, 18. Box beams 12, 16 of the FIG. 1 embodiment and elongate rigid links 20, 22 thereof are not employed in this variation of the first embodiment.

A second damper 56 having housing 56a and plunger 56b is also depicted in FIG. 2 but it is not a required element of the invention because only one damper is required. It is depicted primarily so that one of the six ways to mount a damper may be disclosed more clearly, in view of the somewhat hidden mounting of damper 44.

Top plate 38 is not depicted in FIG. 2 to better reveal the structure of platform 10. In FIG. 2, plunger 56b of damper 56 is pivotally mounted in closely spaced relation to bottom plate 40. A channel or square "U"-shaped upwardly opening bottom mounting bracket 58 is secured to the trailing end of bottom plate 40, just forwardly of box beam 50 on a first side of platform 10. Upwardly opening bottom bracket 58 has a pair of transversely opposed, centrally apertured arms 58a, 58b that receive opposite ends of bottom bracket axle 59 to which is mounted bottom bracket collar 60. Disk-shaped stop member 62 prevents full retraction of plunger 56b into the main body of damper 56. Bottom bracket collar 60 is formed integrally with said stop member 62.

A flat bracket having an aperture formed therein to facilitate pivotal mounting thereto of collar 60 may replace upwardly opening bottom bracket 58. Such a flat bracket is depicted in the embodiment of FIGS. 6-8 and is denoted 58a in such figures.

Substantially the same mounting structure would be employed if plunger 56b were pivotally mounted near top plate 38 as in the second of the five embodiments listed above. In such mounting, bottom mounting bracket 58 would be inverted relative to its bottom plate 40 position and would be referred to as a downwardly opening top mounting bracket. If supplanted by a flat bracket it would be referred to as a top mounting bracket.

The above-mentioned truncate links that collectively form a "V"-shaped assembly are also depicted in FIG. 2 with more clarity than in FIG. 1. There are two dampers in FIG. 2 and only one in FIG. 1 but the mounting assembly for a damper is the same without dependence upon which side of air spring 36 it is mounted.

Top mounting bracket 64, secured in depending relation to top plate 38 at its leading edge, and bottom mounting bracket 66, secured in surmounting relation to bottom plate 40 at its leading edge, provide the mounting means for the "V"-shaped link assembly. Top and bottom mounting brackets 64, 66, respectively, each include a pair of centrally apertured, transversely opposed arms and said central apertures receive opposite ends of an axle member. Those parts are not numbered to avoid cluttering the drawings but said parts are the same as the parts of the same name described in connection with bottom mounting bracket 58. The axle of top mounting bracket 64 receives an apertured leading end of upper truncate link 68 and the axle of bottom mounting bracket 66 receives an apertured leading end of lower truncate link 70. Upper truncate link 68 is positioned at a first end of its associated axle and lower truncate link 70 is positioned at a second end of its associated axle so that the respective trailing ends of said upper and lower links are transversely spaced apart by a distance only slightly less than the distance between the transversely spaced apart arms of their associated mounting brackets.

Top and bottom mounting brackets 64, 66 may be supplanted by a flat bracket having an aperture formed therein to facilitate pivotal mounting thereto of collar 60. Such a flat bracket is denoted 66a in FIGS. 6-7.

The respective trailing ends of truncate links 68, 70 are apertured and a vertex axle is received at its opposite ends within said apertures. Vertex collar 72 receives said vertex axle. The leading end of housing 56a of damper 56 is secured to said vertex collar 72.

When platform 10 is in repose, top plate 38 and bottom plate 40 are spaced apart from one another by a predetermined distance. The predetermined spacing will determine the angle at which damper 56 is positioned relative to said top and bottom plates when the assembly is in repose.

Plunger 56b extends from housing 56a when said plates diverge from one another and is driven into housing 56b when said plates converge toward one another. Such extension and contraction of plunger 56a is caused by the displacement of vertex collar 72 at the vertex of the "V"-shaped assembly. Specifically, the angle between truncate links 68, 70 increases and vertex collar 72 and damper housing 56a are displaced toward the trailing end of the platform when plates 38, 40 diverge from one another and said angle decreases and vertex collar 72 is displaced toward the leading end of the platform when said plates converge toward one another. Accordingly, damper 56 absorbs much of the externally-imparted forces that appear on platform 10 and provides a needed damping action upon air spring 36.

However, damper 56 is inadequate to restore platform 10 to its position of repose after the top and bottom plates have been driven close to one another. That function is performed by air spring 36 which also performs a shock-absorbing function. Thus, both bias means 36 and 56 absorb shocks and help restore platform 10 to its position of repose but air spring 36 alone is inadequate to dampen the shocks without unacceptable oscillations and damper 56 alone is inadequate to restore the platform to said position of repose.

Only one damper and one air spring are needed to provide the needed shock absorbing function and the needed resiliency to the apparatus. Therefore it is clear that either damper 44 or 56 can be eliminated from the FIG. 2 embodiment.

Figure 3:
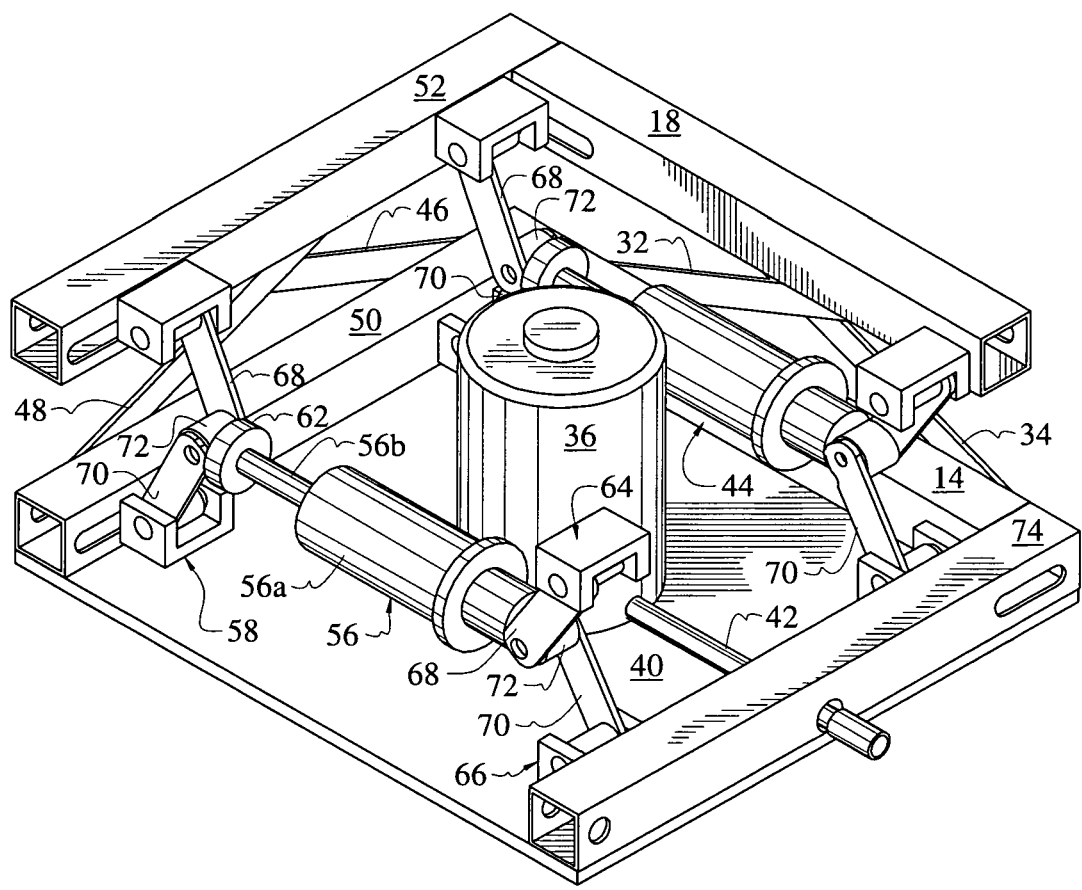
FIG. 3 a perspective view of a third variation thereof.
Figure 4:
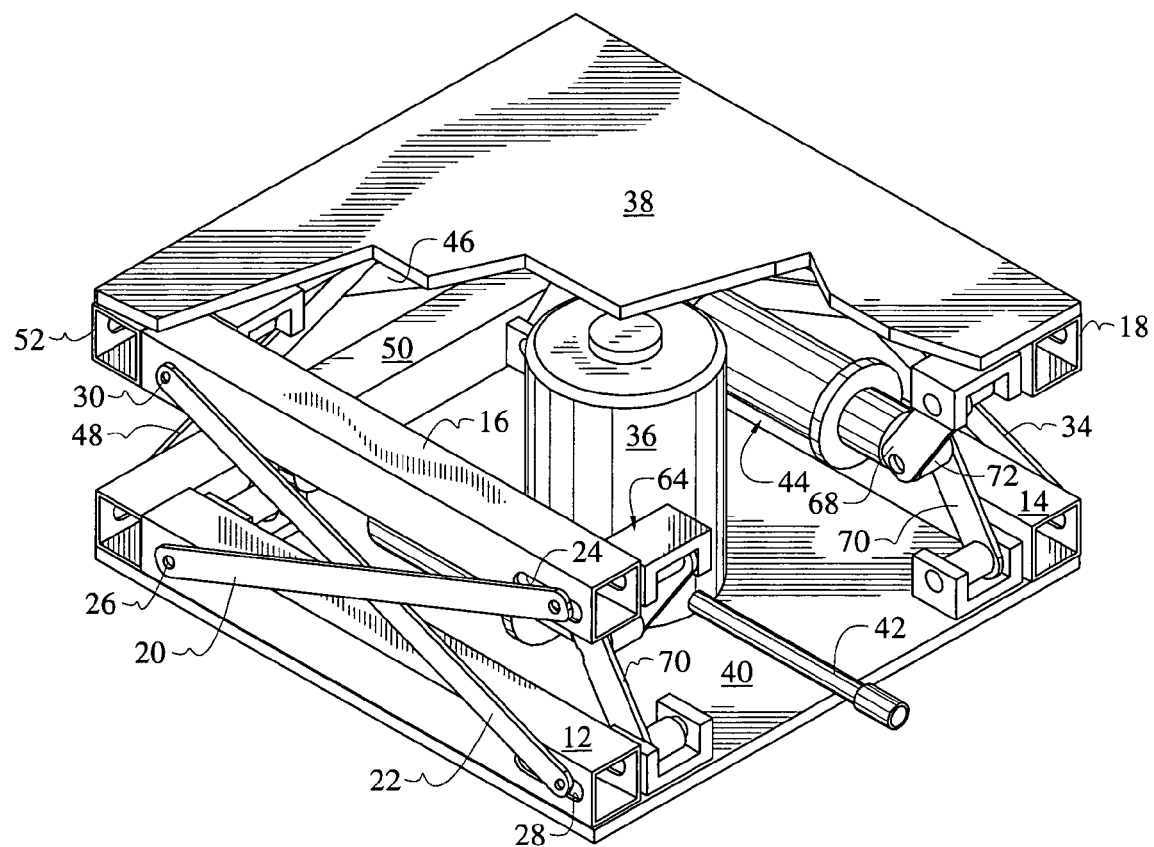
FIG. 4 a perspective view of a fourth variation thereof.
Figure 5:
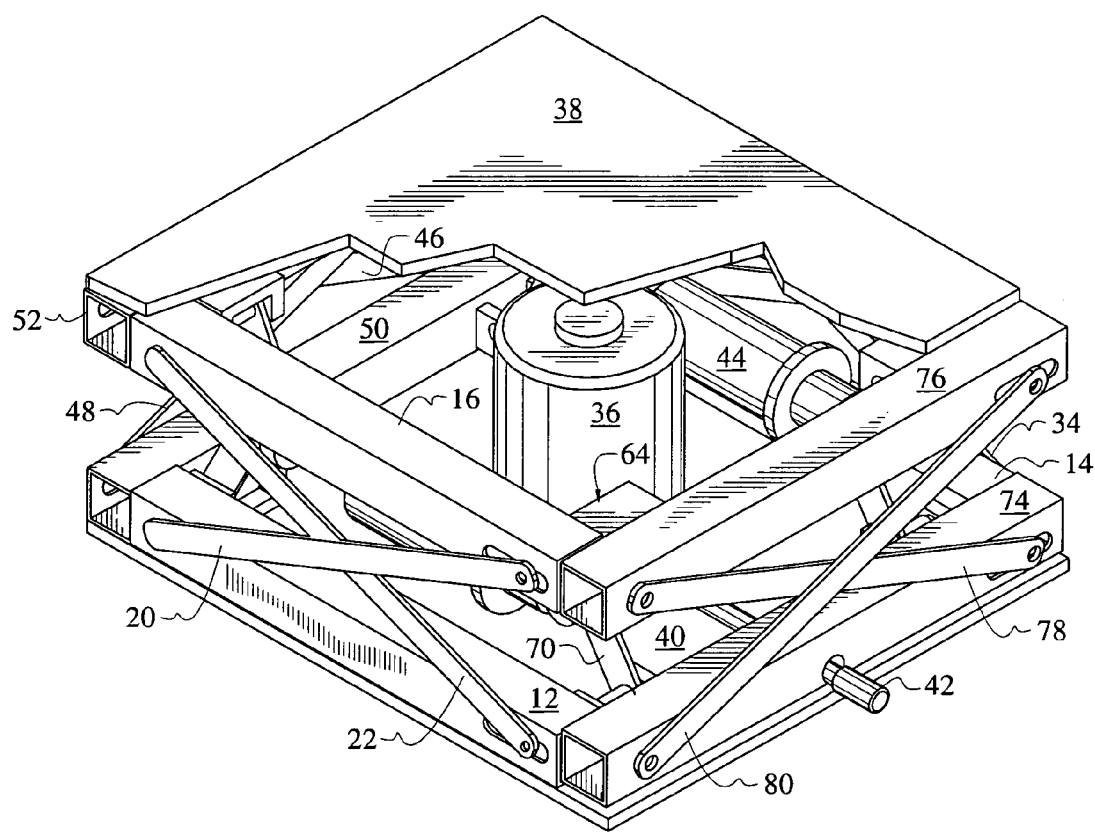
FIG. 5 is a perspective view of a fifth variation thereof.

The variations of FIGS. 3-5 employ parts already described but in differing combinations. Therefore, said parts need not be re-identified in detail.

In the variation of FIG. 3, two dampers 44 and 56 are depicted but, again, either one of them may be eliminated without substantially altering the operation of the inventive structure.

In this variation, the dampers are mounted in substantially parallel relation to top and bottom plates 38, 40. This is the fifth of the six variations listed earlier. The opposite ends of each damper abuttingly engage vertex collars 72, 72 positioned at the vertex of the respective "V"-shaped truncate link assemblies. Thus, instead of a fixed position damper housing from which a plunger extends and contracts as the top and bottom plates diverge and converge, respectively, as in the first two depicted variations, the housing and the plunger diverge from one another as said top and bottom plates diverge from one another and said housing and plunger converge as said plates converge.

FIG. 4 indicates that three sides of platform 10 may be equipped with the pairs of elongate rigid links that are in scissored relation to one another. Any one of said three pairs of elongate rigid links may be removed from the structure without adversely affecting its performance.

FIG. 5 indicates that all four sides of platform 10 may be equipped with the pairs of elongate rigid links that are in scissored relation to one another. This variation includes box beam 74, depicted in FIG. 2, box beam 76 and rigid links 78, 80. Any two of said four pairs of rigid links and their associated box beams may be removed from the structure without adversely affecting its performance.

The second embodiment of this invention is directed to a shock absorbing seat bottom as distinguished from the platform of the first embodiment and is depicted in three variations in FIGS. 6-8. It provides a seat bottom having a minimum height that is less than the minimum height of the platform of FIGS. 1-5. Air spring 36 is replaced by at least one arched leaf spring, collectively denoted 37. Each arched leaf spring 37 has opposed parts 37a, 37b that are inherently flexible and resilient. Parts 37a, 37b are of arcuate structure so that their respective centers are spaced apart from one another and their respective opposite ends are connected to one another.

Each arched leaf spring 37a is secured at its center or mid-point to top plate 38 by strap bracket 39a or other suitable fastening means and each arched leaf spring 37b is secured at its center or mid-point to bottom plate 40 by strap bracket 39b or other suitable fastening means.

Because each arched leaf spring 37a, 37b has a thin profile, top plate 38 and bottom plate 40 may be brought very close together when an external shock is applied to the seat bottom. Note that the height of air spring 36 in the embodiments of FIGS. 1-5 provides a limit to the convergence of said top and bottom plates. Arched leaf springs 37a, 37b provide no such limit.

Although not depicted, it should also be clear that arcuate part 37b could be placed in surmounting, abutting relation to arcuate part 37a. In that configuration, the opposite ends of the upper spring would be secured to the bottom of top plate 38 and the opposite ends of the lower spring would be secured to the top of bottom plate 40.

It should also be observed that the seat bottom embodiment of FIGS. 6-8 further eliminates the box beams of the platform embodiment of FIGS. 1-5. Each box beam is supplanted by a flat beam.

Both the platform of the first embodiment and the seat of the second embodiment could be roto molded. Such molding would include the formation of integral brackets so that all brackets would be of the simple, flat type, eliminating the upward-opening and downward-opening brackets having transversely opposed arms and axles interconnecting such arms. Roto molding also removes hard, sharp edges as is desirable for a seat construction including a vinyl cover.

In addition to roto molding, the various parts of this invention may also be fabricated through other molding means. Moreover, manufacturing methods that do not rely upon molds are also within the scope of this invention.

The opposite ends of elongate, scissor-connected link 20 are instead mounted to low-profile flat mounting brackets 20a, secured to top plate 38, and 20b, secured to bottom plate 40.

The opposite ends of elongate, scissor-connected link 22 are mounted to low-profile flat mounting brackets 22a, secured to top plate 38, and 22b, secured to bottom plate 40.

The opposite ends of elongate, scissor-connected link 32 are mounted to low-profile flat mounting brackets 32a, secured to top plate 38, and 32b, secured to bottom plate 40.

The opposite ends of elongate, scissor-connected link 34 are mounted to low-profile flat mounting brackets 34a, secured to top plate 38, and 32b, secured to bottom plate 40.

The opposite ends of elongate, scissor-connected link 46 are mounted to low-profile flat mounting brackets 46a, secured to top plate 38, and 46b, secured to bottom plate 40.

The opposite ends of elongate, scissor-connected link 48 are mounted to low-profile flat mounting brackets 48a, secured to top plate 38, and 48b, secured to bottom plate 40.

Note that each low profile flat mounting bracket has a height substantially equal to the vertical dimension of an elongate link. Note further that each flat beam has a height profile or vertical extent lower than the corresponding height profile or vertical extent of the box beams replaced thereby.

This embodiment also obviates the channel or square "U"-shaped upwardly opening bottom mounting brackets and downwardly opening top mounting brackets of the embodiments of FIGS. 1-5. Said brackets are replaced by substantially flat brackets such as 58a and 66a depicted in FIGS. 6 and 7. Each flat bracket is apertured to receive an axle upon which is secured an apertured end of a truncate link, the apertured end of an elongate link, or the collar of a damper. The axle and hence the link or collar is retained by a suitable cotter pin, "C"-clip, or the like.

The variation of FIG. 7 is like that of FIG. 6 except that the opposite ends of lower arched leaf springs 37b are connected directly to top plate 38. Accordingly, upper arched leaf springs 37a and strap brackets 39a are eliminated. This enables top plate 28 and bottom plate 40 to come even closer to one another when a shock is imparted to platform 10.

An unillustrated embodiment is the mechanical equivalent of the FIG. 7. In such unillustrated embodiment, the opposite ends of upper arched leaf spring 37a are connected to bottom plate 40 and said upper arched leaf spring 37a is connected to top plate 38 at its center or mid-point.

The arched leaf springs of this embodiment are less subject to fatigue and therefore have a longer life than flat steel leaf springs or coiled springs. They also provide greater bias in a comparable travel space.

A single damper 44 is employed in the variations of FIGS. 6 and 7 and in the unillustrated embodiment. Damper 44 prevents oscillation of the arched leaf springs as they absorb successive shocks.

FIG. 8 includes a leg roll 38a which is a humped region of top plate 38 that accommodates damper 44. Leg rolls are commonly provided in seat bottoms to help prevent unwanted sliding in a forward direction out of such seat bottom. It should be understood that the seat bottom of FIGS. 6-8 is covered with comfortable foam for cushioning purposes and a layer of vinyl or other suitable cover material overlies the foam to produce an aesthetically attractive seat bottom where the inner structure thereof is fully hidden. This also ensures that the structure is safe to use. It is also worth noting that the structure, although characterized as a horizontally disposed seat bottom, could also be used as a generally vertically disposed seat back.

The novel platform disclosed herein is not limited to use as a structure to stand upon or to mount a seat upon. Any other item requiring a shock-absorbing platform may be mounted thereupon. For example, a military application might use the platform as a gun mount or as a mount for fragile or other sensitive equipment.

The novel seat bottom or seat back disclosed herein could also be stood upon if proper auxiliary support means for a standing person are provided. The high shock-absorption capabilities of the novel seat bottom or back, coupled with its low profile construction, make it ideal for use on the vehicles mentioned above and similar vehicles that are used in ways that require enhanced protection of the occupants from severe shocks.

It will thus be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described,

What is claimed is:

1. A seat bottom that absorbs shocks, said seat bottom adapted to be mounted in a vehicle that subjects its occupants to severe shocks, comprising:
    a bottom plate having a predetermined geometric configuration;
    a top plate having a predetermined geometric configuration, said top plate disposed in vertically spaced, parallel relation to said bottom plate;
    at least two pairs of elongate rigid links positioned on any two preselected sides of in interconnecting relation to said bottom and top plates;
    each pair of elongate rigid links being disposed in a scissors configuration so that said bottom plate and top plate remain in said parallel relation to one another when said vertical distance between said bottom and top plates is abruptly changed by application of an external force to said platform;
    a bias member positioned in sandwiched relation between said top plate and said bottom plate;
    said bias member having sufficient bias to return said top plate and said bottom plate to a position of equilibrium after said external force has been applied to said seat bottom;
    a damper member disposed in sandwiched relation between said top plate and said bottom plate, said damper member being effective to damp oscillation of said bias member;
    said bias member including at least one arched leaf spring;
    said at least one arched leaf spring having opposite ends secured to said top plate and said at least one arched leaf spring being connected at its mid-point to said bottom plate;
    said damper member having a first end secured to said top plate and a second end secured to said bottom plate;
    said damper member being substantially horizontally disposed when said top plate and bottom plate are in a fully compressed configuration so that said damper member does not interfere with said top and bottom plate when said top and bottom plates are in said fully compressed configuration.

2. The seat bottom of claim 1, further comprising:
    a leg roll formed in said top plate;
    said leg roll including a hump that accommodates said damper means.

* * * * *